(12) United States Patent
Chao

(10) Patent No.: US 7,467,866 B2
(45) Date of Patent: Dec. 23, 2008

(54) SPECTACLES FOR ATTACHING DECORATIVE LABELS

(76) Inventor: Kuo-Lung Chao, P.O. Box 697, Fongyuan City, Taichung County (TW) 420

( * ) Notice: Subject to any disclaimer, the term of this patent is extended or adjusted under 35 U.S.C. 154(b) by 0 days.

(21) Appl. No.: 11/402,882

(22) Filed: Apr. 13, 2006

(65) Prior Publication Data

US 2007/0242211 A1   Oct. 18, 2007

(51) Int. Cl.
*G02C 11/02* (2006.01)
(52) U.S. Cl. .......................... 351/52; 351/51
(58) Field of Classification Search ............... 351/51, 351/52, 41, 111
See application file for complete search history.

(56) References Cited

U.S. PATENT DOCUMENTS 5,233,371 A * 8/1993 Guillet ..................... 351/111
5,627,607 A * 5/1997 Grau ......................... 351/52

* cited by examiner

*Primary Examiner*—Huy K Mai

(57) ABSTRACT

A decorative label attaching to the spectacles includes a pair of wide frames connected by a bridge, a pair of lenses respectively disposed into the frames and a pair of wide temples respectively hinged with the outer periphery of the frames by a pair of screws. The temples each has a dovetail groove in an outer surface abutting front end thereof for slidably engaging with a pair dovetail decorative labels respectively. It is characterized in that the decorative label is varied in form and versatile in style in order to attract people.

7 Claims, 16 Drawing Sheets

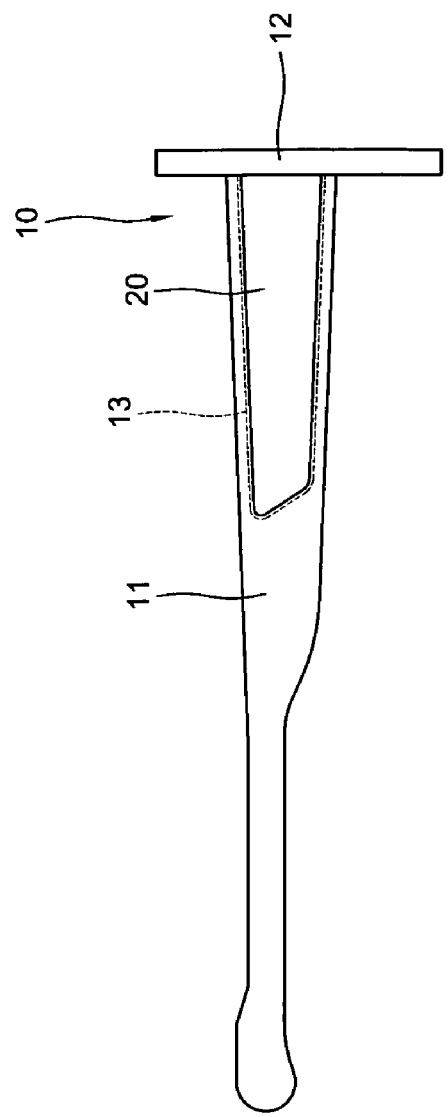
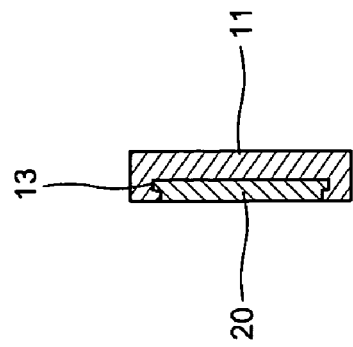

SPECTACLES FOR ATTACHING DECORATIVE LABELS

BACKGROUND OF THE INVENTION

The present invention relates to spectacles and more particularly to a decorative label attaching to the spectacles.

The manufacturer of the spectacles always prints or engraves the brand or trademark of his company on the outer side of a temple of the spectacles. Due to the characters are too small to be visible, it attracts nobody. Thus, same of the manufacturers adopts a brand sleeve wrapped on the temple, but it is unstable.

The applicant has previously filed a patent application in the title of attachable label to the spectacles before the Patent Office of the Republic of China. But this invention requires screws to fasten the label on the spectacles that causes inconvenience.

SUMMARY OF THE PRESENT INVENTION

The present invention has a main object to provide a decorative label attaching to the spectacles which need not a screw but the label is protected by the inner side of the frame of the spectacles.

Another object of the present invention is to provide a decorative label attaching to the spectacles in which the label is attached to a front side of the frame or to a predetermined position of the frame. The label is large enough to attract people.

Accordingly, the decorative label of the present invention comprises a spectacles having a pair of frames connected by a bridge and a pair of temples. One of the temples has a positioning groove for inlaying a decorative label therein. The label may be an alignment of characters, colored patterns, sculptures, three-dimensional object and that the MP3 or LED is included or that the gold or diamond is inlaid.

The present invention will become more fully understood by reference to the following detailed description thereof when read in conjunction with the attached drawings.

BRIEF DESCRIPTION OF THE DRAWINGS

FIG. 3 is a side view of FIG. 2, FIG. 4 is a sectional view to show a decorative label inlaid into a guide groove.

DETAILED DESCRIPTION OF THE PREFERRED EMBODIMENT

Figure 1:
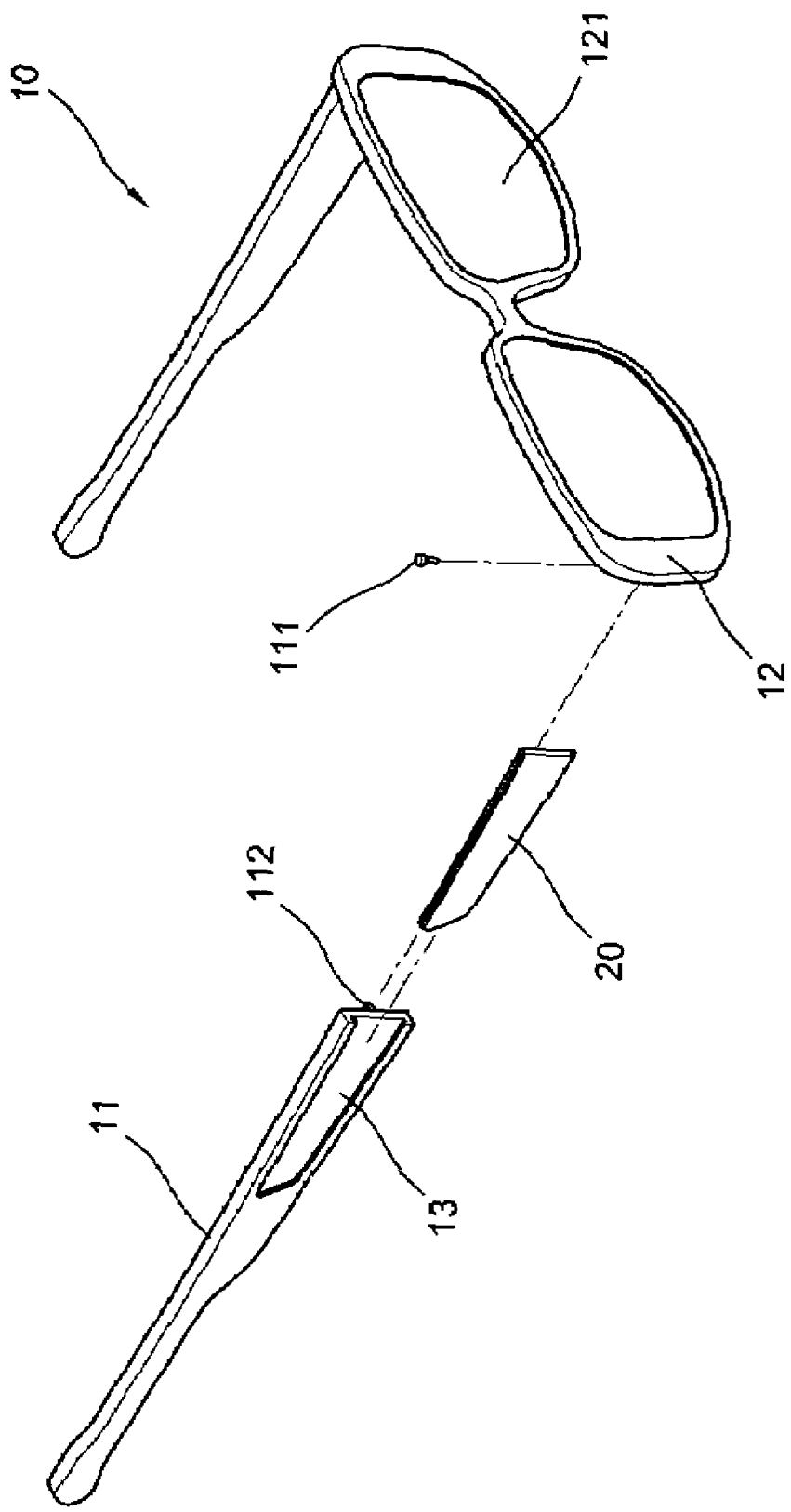
FIG. 1 is an exploded perspective view of a first embodiment of the present invention.
Figure 2:
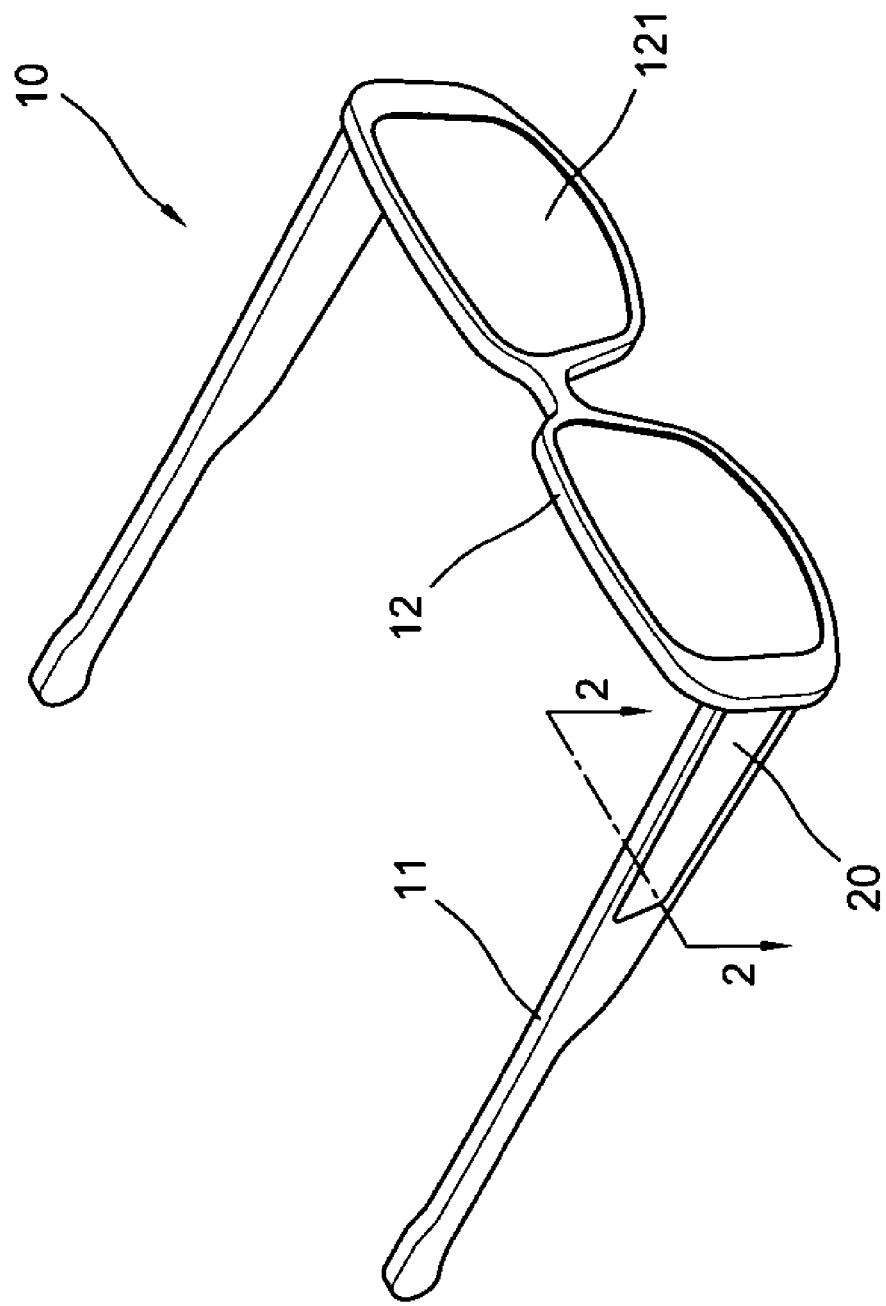
FIG. 2 is a perspective view to show the assembly of FIG. 1.
Figure 5:
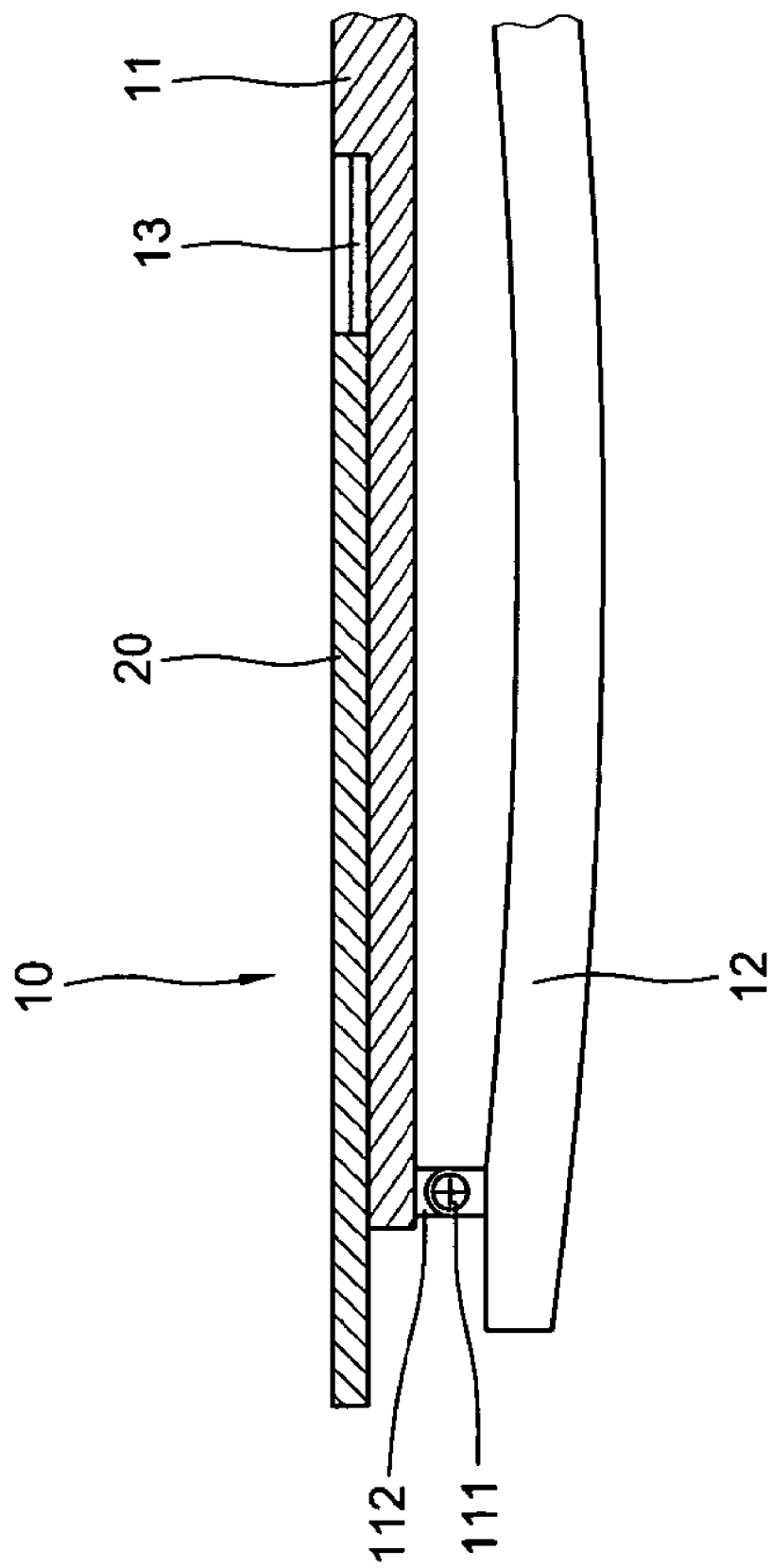
FIG. 5 is a sectional view to show the temple is collapsed and the label is removable.
Figure 6:
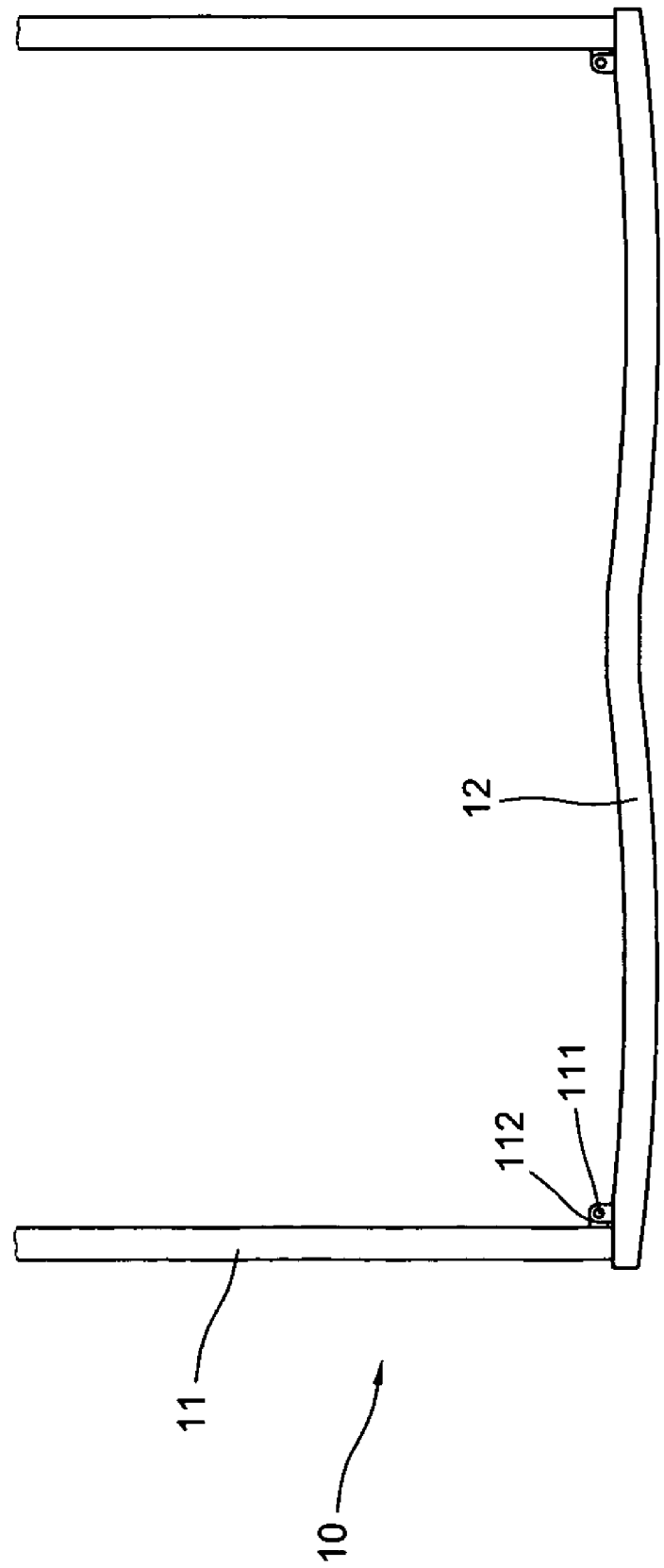
FIG. 6 is a top view of the spectacles while the temple are displayed.

With reference to the drawings and initiated from FIGS. 1-6, a first embodiment of the decorative label of the present invention comprises a spectacles 10 having a pair of wide temples 11 hinged on with a pair of wide frames 12 by the hinges 112 and screws 111 respectively and a pair of lenses 121 inlaid into the frames 12 both the temples 11 and the frames 12 are made of carbon fiber and/or plastic which is of the flexible material, a dovetail groove 13 in the outer side of each of the temples 11 having an opening at front end of the temples 11, at least a dovetail decorative label 20 slides into the dovetail grooves 13. The decorative label 20 is of a block or a plate on which is engraved with the Chinese, English, Korean or Japanese characters or colored patterns or inlaid with gold, and diamonds or the MP3, LED being included and/or attached with the engraves or three-dimensional object. When the wearer displays the temples 11 and wears the spectacles, the decorative label shall not be broken out of the grooves 13 because the inner side of the frames blocks the opening of the grooves 13 so it need no any screw to fasten the decorative label 20 within the grooves 13. If the wearer wants to replace the decorative label 20, he may collapse the temples, the old ones are easily to remove out and slides the new ones into the grooves 13. It is very convenient. Further, the decorative label 20 may be magnetized in order to attract other decorative objects and/or an attachable sunglasses.

Figure 7:
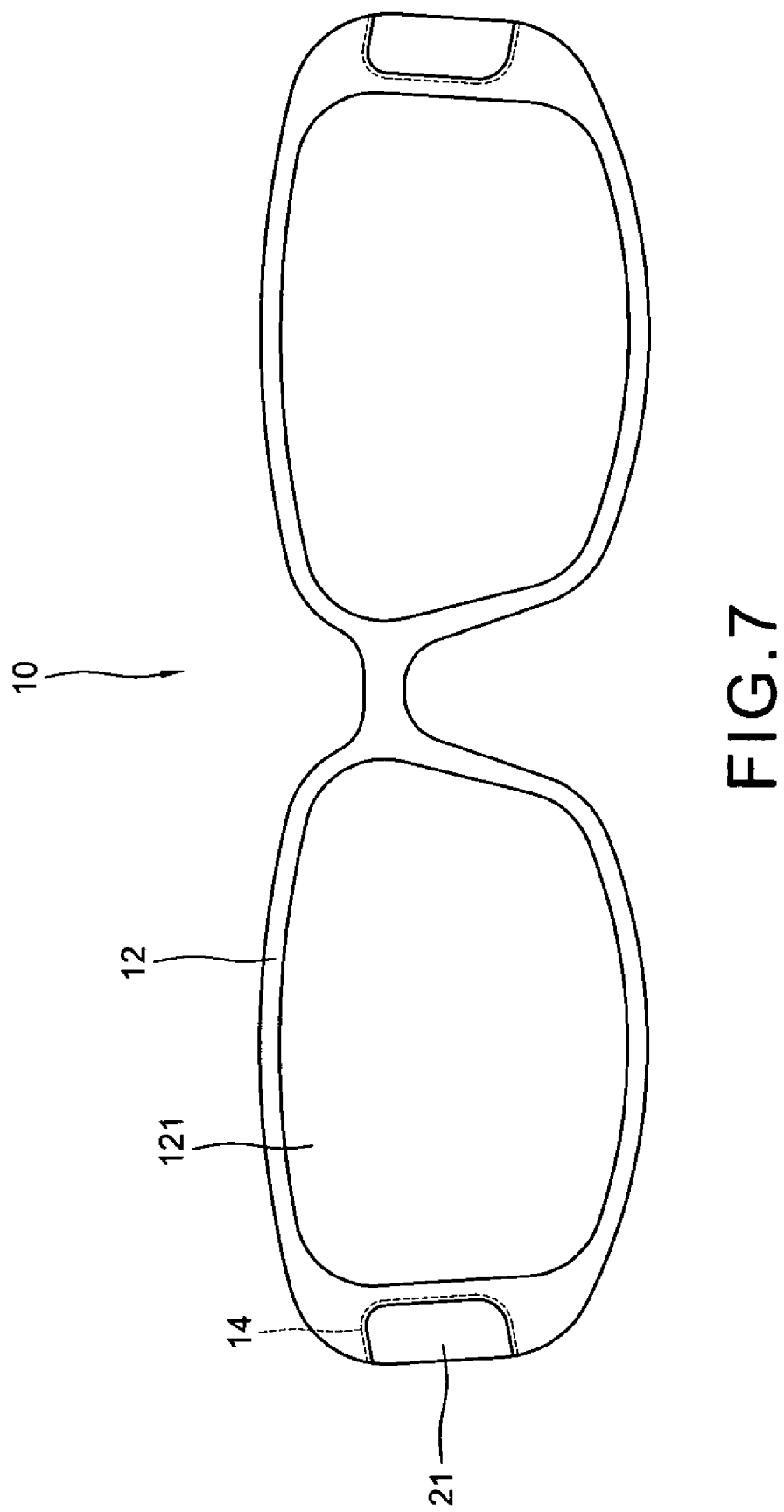
FIG. 7 is a plane view to show an alternate arrangement of the labels are inlaid in the front sides of the frames.
Figure 8:
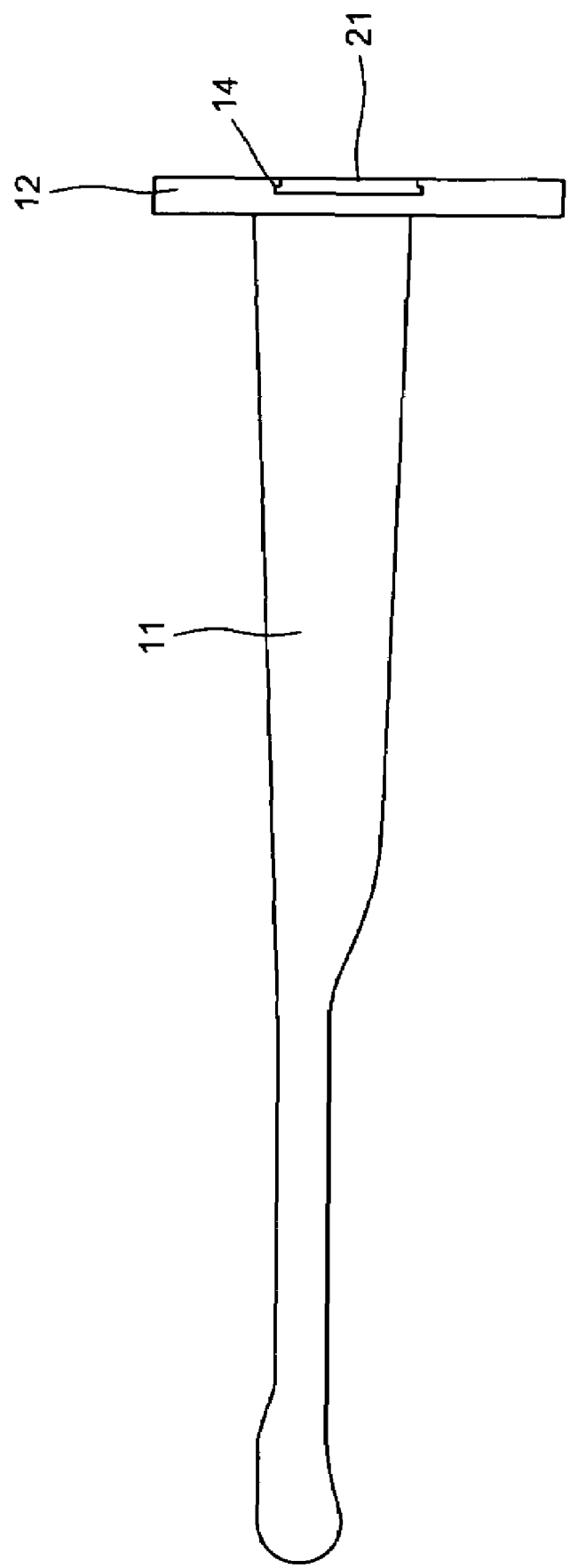
FIG. 8 is a side view of FIG. 7.

Referring to FIGS. 7 and 8, an alternate arrangement for the decorative label is provided. That is to form a groove 14 in the outer front portion of each of the frames 12 for pressing in a pair of identical decorative labels 21, because both the grooves 14 and the labels 21 are in the shape similar dovetail, when the labels 21 are pressed into the grooves 14, the engagement must be very tight.

Figure 9:
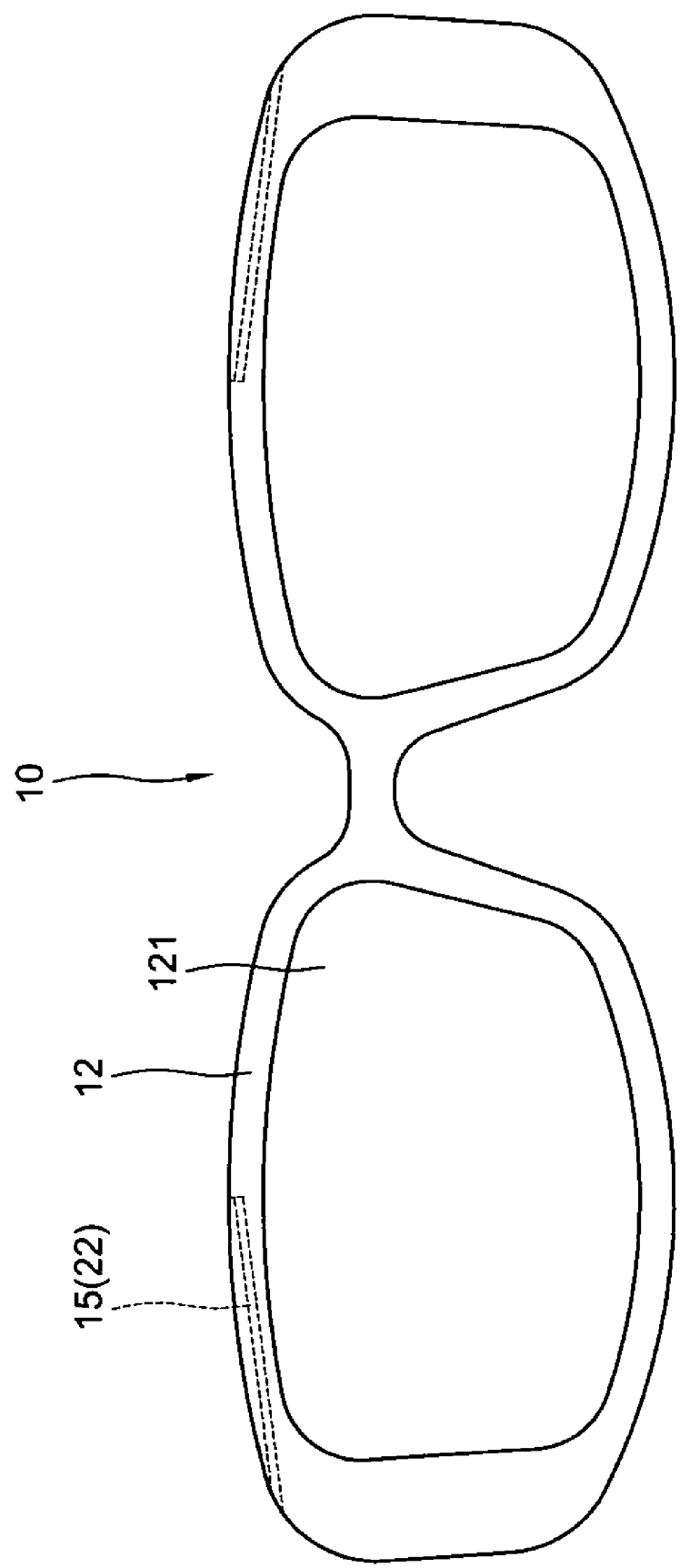
FIG. 9 is a plane view to show another alternate arrangement of the decorative label which is positioned in a top of the frames.
Figure 10:
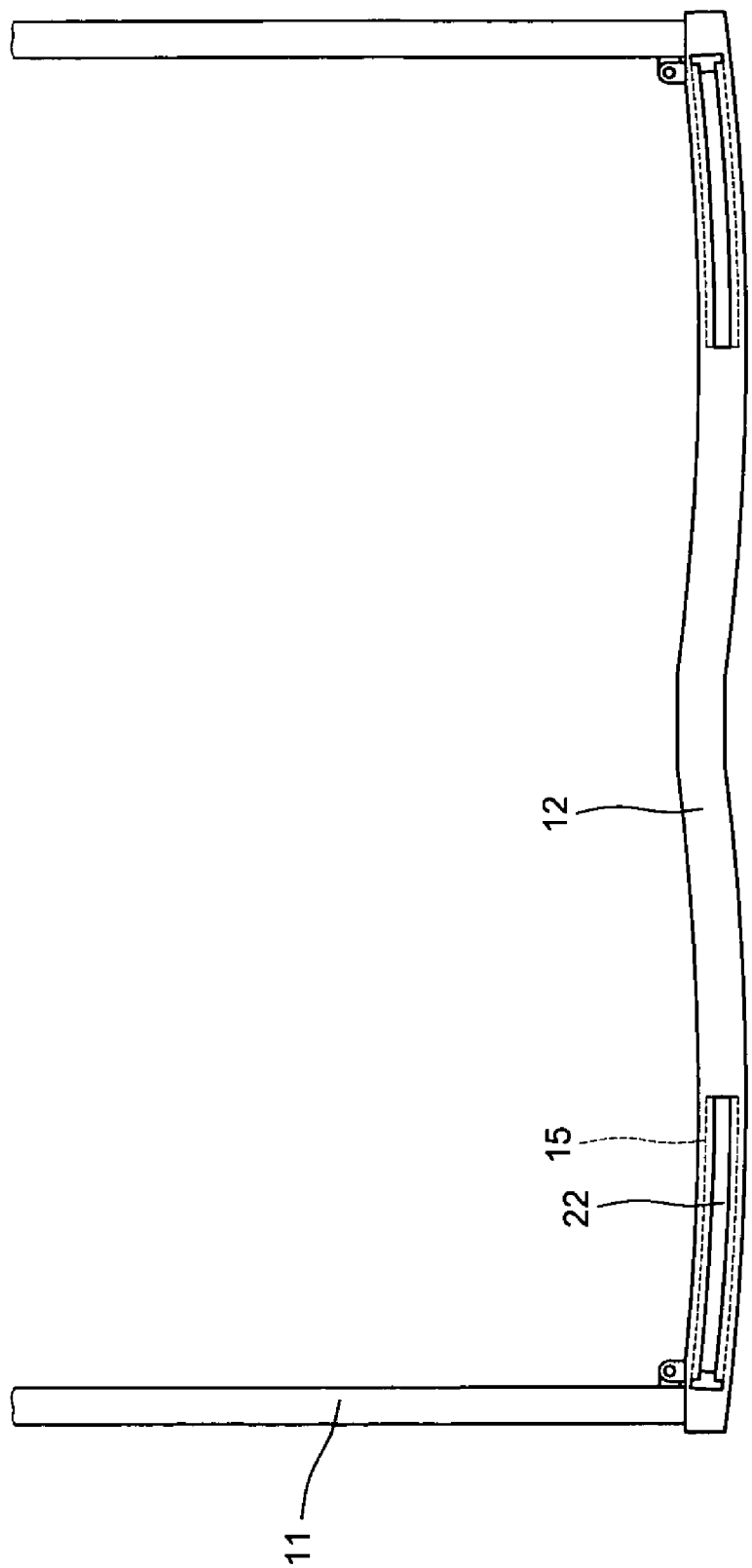
FIG. 10 is a top view of FIG. 9.

FIGS. 9 and 10 provide another alternate arrangement for engaging the decoratives 22 to the spectacles 10. That is to form a groove 15 of similar dovetail shaped in an upper portion of the frames 12 for pressing in a pair of identical shaped decorative labels 21 therein, these labels 22 shall be shining in color to attract people. Due to pressing engagement, it must be very tight, too.

Figure 11:
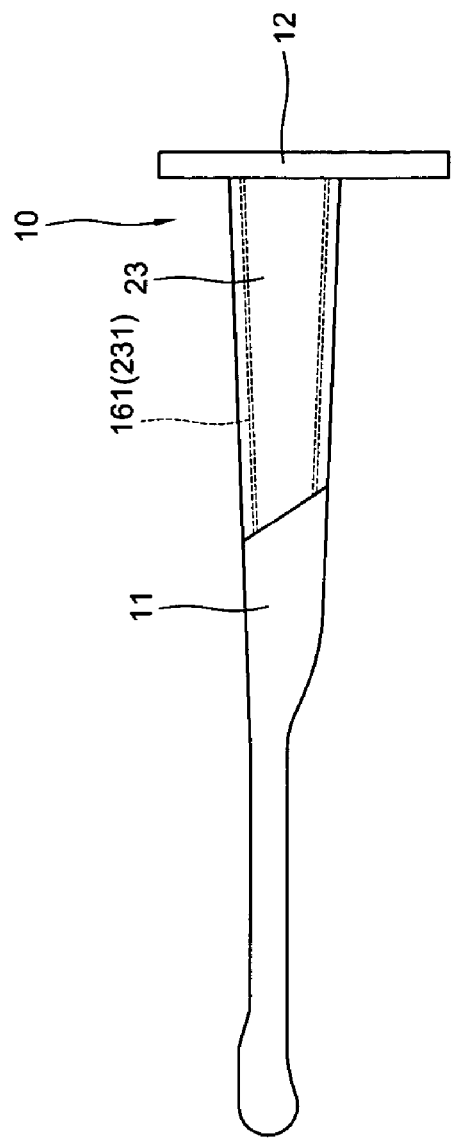
FIG. 11 is a side view to show still another alternate arrangement of the decorative label positioned at the temple of the spectacles.
Figure 12:
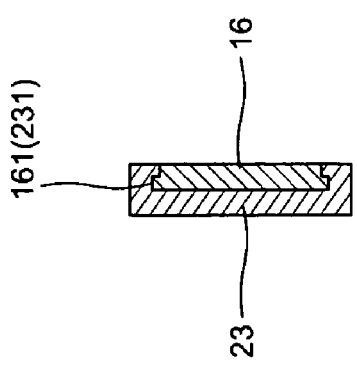
FIG. 12 is a sectional view of FIG. 11.

FIGS. 11 and 12 show still another arrangement for a decorative label 23. That is to form a protrudent plate 16 on an outer surface of each of the temples 11. Each of the plates 16 has a guide flange on the upper and lower edges, where the labels 23 are of the identical shaped cap slightly wider than the protrudent plates 16 and has a guide groove 231 in the upper and lower side walls made engageable with the guide flanges of the protrudent plates 16. When the temples 11 are collapsed, slide the labels 23 onto the protrudent plates 16 and when the temples 11 are displayed, the inner side of the frames 12 will prevent the labels 23 from breaking out of the plate 16.

Figure 13:
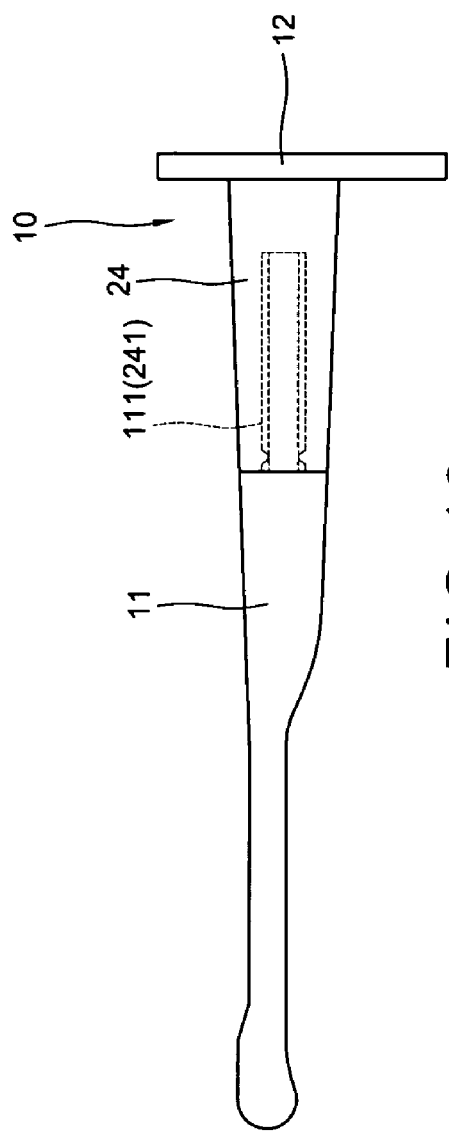
FIG. 13 is a side view to show a further alternate arrangement of the decorative label positioned at the temple of the spectacles.
Figure 14:
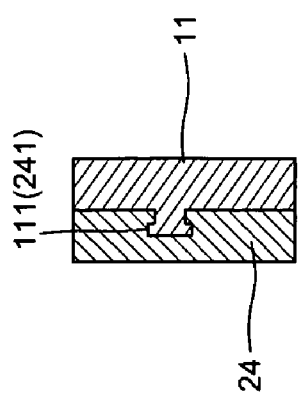
FIG. 14 is a sectional view of FIG. 13.

FIGS. 13 and 14 provide a further arrangement for a plate label 24 which has a positioning grooves 241 of T-shaped section centrally formed in an inner side made engageable with a protrudent guide plate 111 of T-shaped section on the outer surface of front portion of the temples 11, slide the labels 24 onto the protrudent guide plate 111 frictionally, it shall be light enough.

Figure 15:
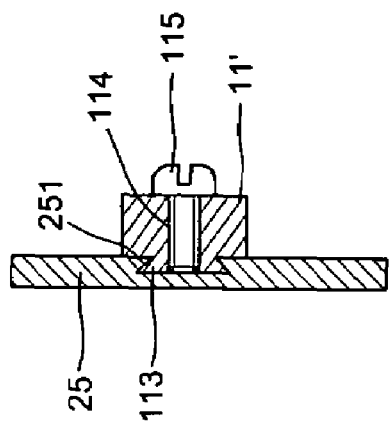
FIG. 15 is a sectional view to show a still further alternative arrangement of the decorative label positioned at the temple of the spectacles.
Figure 16:
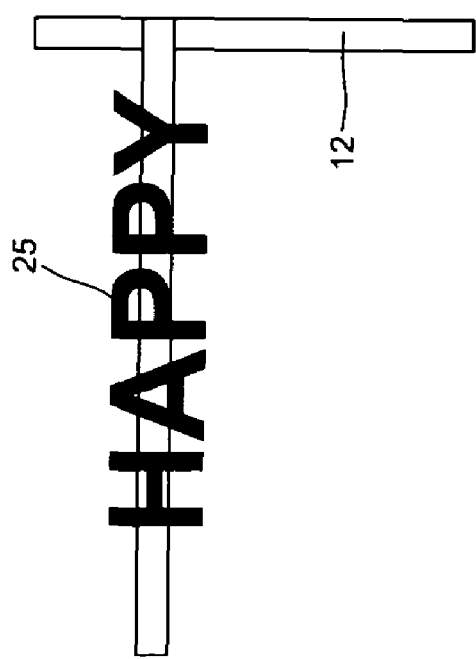
FIG. 16 is a side view of FIG. 15 to show that the label is an alignment of letters to form a word—HAPPY—.
Figure 17:
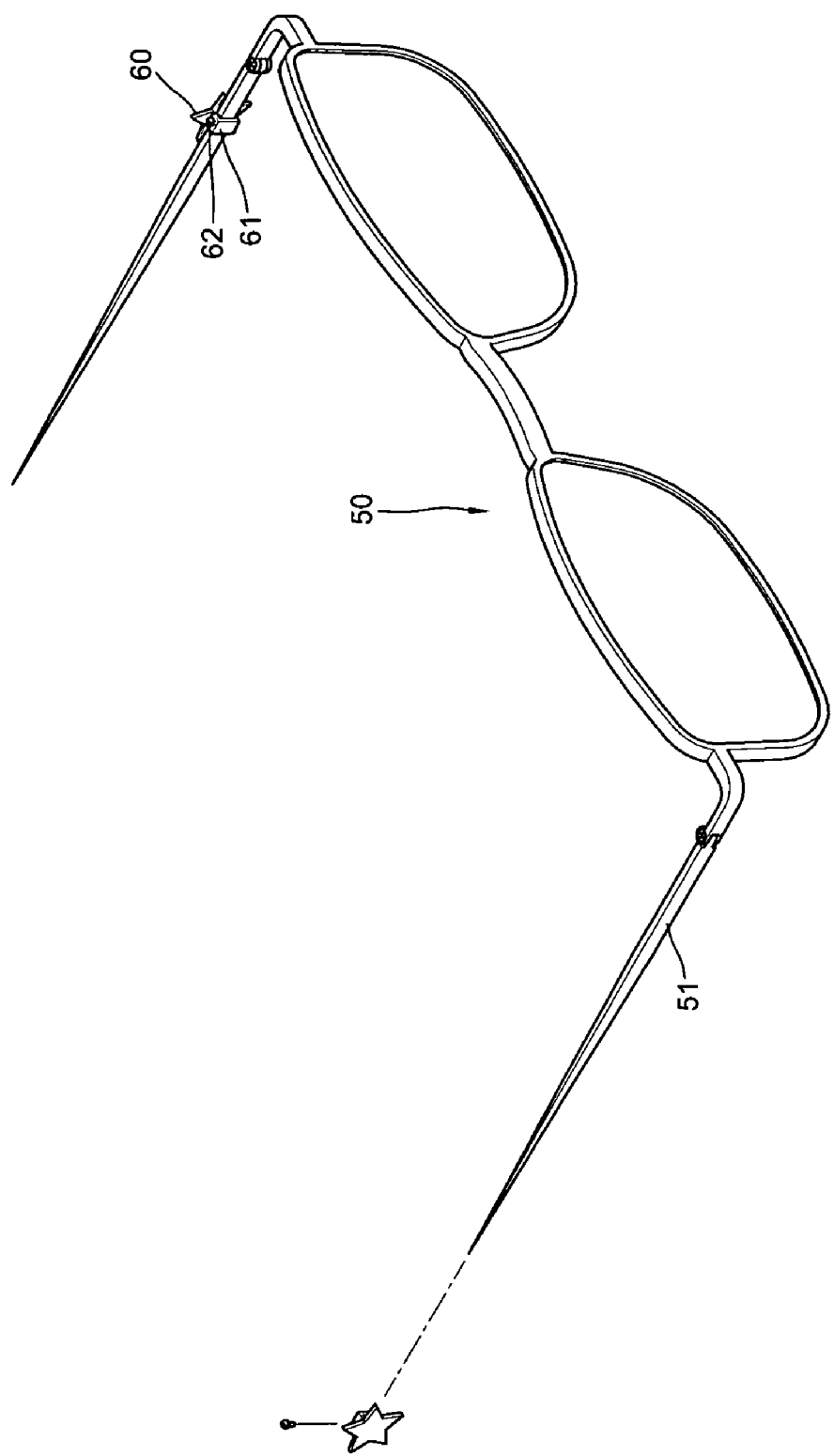
FIG. 17 is an exploded perspective view to show a second embodiment of the present invention.

FIGS. 15 and 16 show a still further arrangement for the letter labels 25, each of the letter labels 25 has a dovetail groove 251 through a center engaged with a dovetail projection 113 centrally formed on the outer surface of the temples 11 each of which has an alignment of screw holes 114 in the center through the dovetail projection 113. So the letter labels 25 may sequentially slide on the dovetail projection 113 to spell a word or a phrase, each of the letter labels stopped against a plurality of screws 115 which screw into the screw holes 114 from the inner side of the temples so that the engagement of the labels 25 with the temple shall be very tight. The spelling of the word or phrase may be of different language. But in this instance is of a English word "HAPPY".

Figure 18:
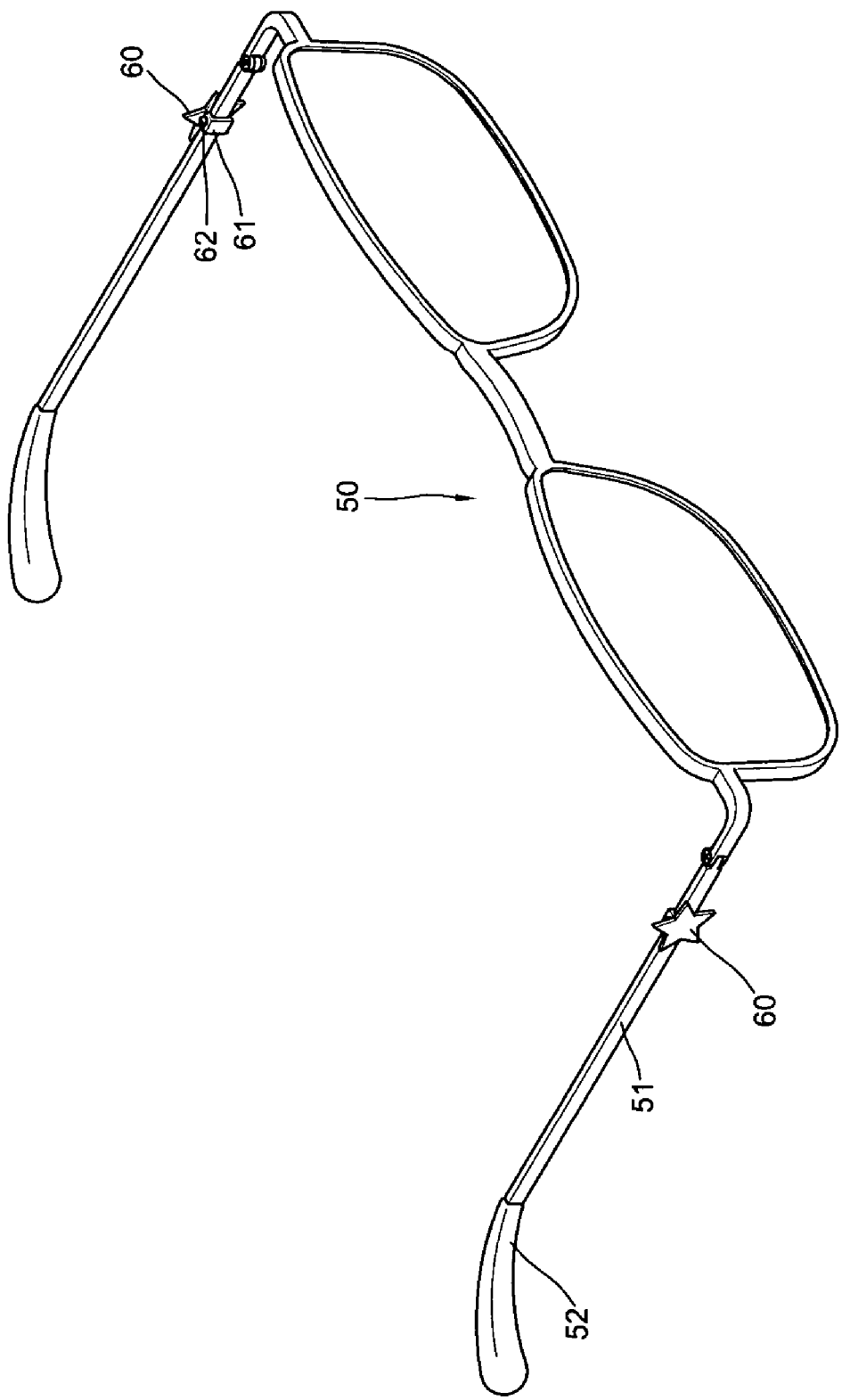
FIG. 18 is a perspective view to show the assembly of FIG. 17.
Figure 19:
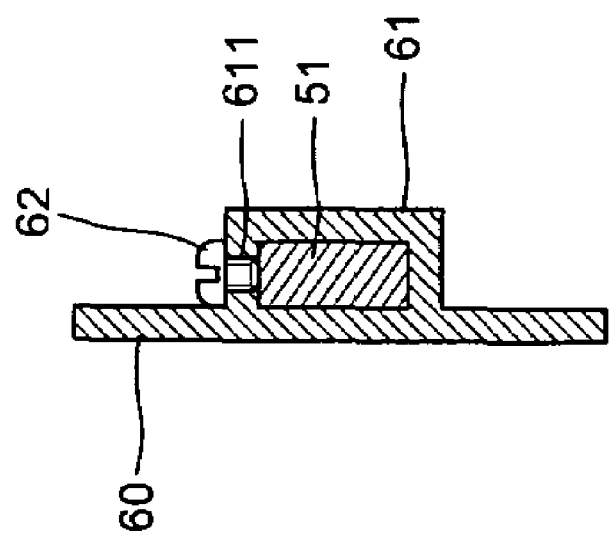
FIG. 19 is a sectional view of FIG. 18.
Figure 20:
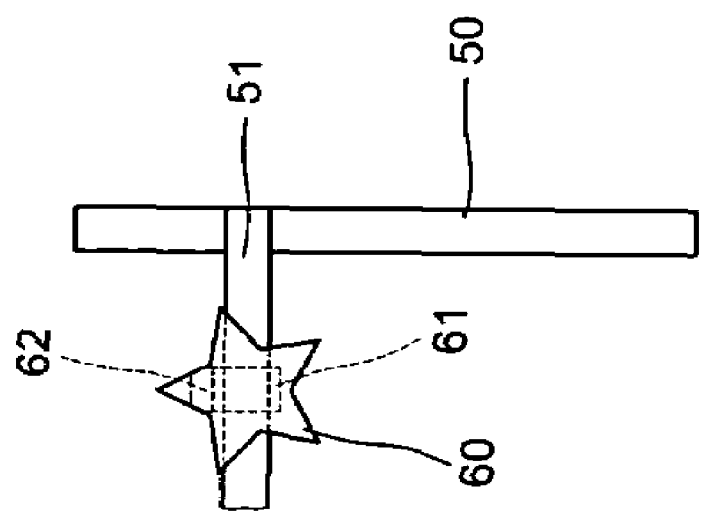
FIG. 20 is a side view of FIG. 18.

Referring to FIGS. 17 to 20, a second embodiment of the decorative label attaching to the spectacles of the present invention is provided. This embodiment comprises a spectacles 50 having a pair of bends respectively integrated with an outer periphery of the frames for hinging with a pair of narrow temples 51 each having a tip free end, a pair of star shaped decorative labels 60 each having a rectangular sleeve 61 on inner side wrapped onto a front portion of the temples 51 and secured by a pair of screws 62 from the top of the sleeves 61 through a screw hole 611 and stopped against the upper surface of the temples 51 (as shown in FIG. 19) and a pair of end pieces 52 sleeved onto the tip free end of the temples 51 (as shown in FIG. 18).

Figure 21:
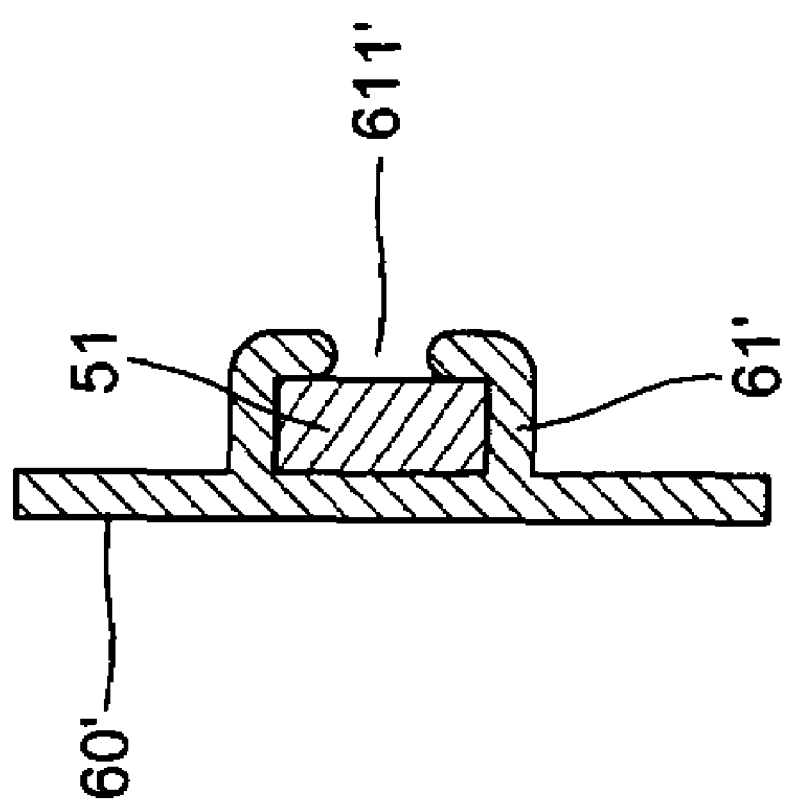
FIG. 21 is a sectional view to show an alternate arrangement of the decorative label of FIG. 19 where the sleeve is changed to an elastic clamp.

FIG. 21 shows a alternate star shaped decorative label 60' which has also a rectangular sleeve 61' centrally formed on inner side including slit 611' to make the sleeve 61' to be elastic so that the sleeve 61' can either lightly wrap onto the temples 51 without using a screw 62.

Note that the specification relating to the above embodiment should be construed as an exemplary rather than as a limitative of the present invention, with many variations and modifications being readily attainable by a person of average skill in the art without departing from the spirit or scope thereof as defined by the appended claims and their legal equivalents.

I claim:

1. Spectacles for attaching decorative labels comprising:
   a spectacles having a pair of wide frames connected by a bridge, a pair of wide temples respectively hinged to an outer periphery of said frames and a pair of lenses respectively inlaid into said frames wherein said temples each having a dovetail groove in an outer side of front portion and each having an opening at front end of said temples for engaging a pair of dovetail decoration labels respectively.

2. The spectacles as recited in claim 1, wherein said frames and said temples are made of carbon fiber and/or plastic.

3. The spectacles as recited in claim 1, wherein said decorative label is of a block, a plate engraved with Chinese, English, Korean or Japanese characters, colored patterns, inlaid with gold and diamonds included with MP3 and LED and/or attached with engraves and/or three-dimensional objects.

4. The spectacles as recited in claim 1, wherein said decorative label is magnetized.

5. The spectacles as recited in claim 1, wherein said decorative label is a cap engaged with a protrudent plate on an outer side of said temples, said labels each having a pair of guide grooves respectively formed in an upper and a lower wall engaged with a pair of guide flanges at an upper and a lower edge of said protrudent plates.

6. The spectacles as recited in claim 1, wherein said label is a plate having a positioning groove of T-shaped section centrally formed in an inner side engaged with a protrudent guide plate of T-shaped section on an outer surface of said temples.

7. The spectacles as recited in claim 1, wherein said label is of letter labels each having a dovetail groove through a center engaged with a dovetail projection on an outer surface of said temples, an alignment of screw holes through said temples and said dovetail projections and a plurality of screws screwed into said screw holes from inner side of said temple and stopped against said dovetail grooves.

\* \* \* \* \*